3,666,500
METHOD OF IMPROVING WAX-CONTAINING SELF-POLISHING EMULSIONS AND PRODUCT
Joachim Lange, Gersthofen, Otto Malitschek, Augsburg, and Fred Mader, Nordendorf, Germany, assignors to Farbwerke Hoechst Aktiengesellschaft vormals Meister Lucius & Bruning, Frankfurt am Main, Germany
No Drawing. Continuation of abandoned application Ser. No. 746,319, July 22, 1968. This application Mar. 15, 1971, Ser. No. 124,439
Claims priority, application Germany, Aug. 5, 1967, F 53,151
Int. Cl. C08h 9/06; C09f; C09g 1/10
U.S. Cl. 106—6
2 Claims

ABSTRACT OF THE DISCLOSURE

The present invention provides non ionic aqueous self-polishing emulsions for the care of floors containing waxes carrying carboxyl groups, non ionic emulsifiers and 0.25 to 3 equivalents, calculated on the carboxyl groups, of soluble salts of zinc, aluminum or cadmium and, if desired, polymer dispersions.

CROSS-REFERENCE TO RELATED APPLICATION

This application is a continuation of application Ser. No. 746,319, filed July 22, 1968, now abandoned.

Self-polishing emulsions for the care of floors are manufactured from wax emulsions or polymer dispersions or mixtures of both. They may contain additives such as resin solutions, plasticisers and surface-active compounds. Films of such self-polishing emulsions must possess a series of basic properties as regards the technique of use, for example high intrinsic gloss, homogeneous appearance, adequate adhesion to the floor covering, good resistance to water and detergents, mechanical strength, low tackiness and good removability.

Some of these properties, especially the intrinsic gloss and the mechanical strength can be produced relatively simply by correct choice and suitable combination of the raw materials to be formulated. Against this it is difficult to manufacture films which are on the one hand insensitive to water and the weakly alkaline cleaning agents which are generally used for cleaning, whilst they can on the other hand again be completely detached by means of suitable removing agents in order to prevent the formation of layers on the floor. Films which can be too easily removed frequently show undesired spots, due to incipient solution of the film, when merely water or dilute cleaning agents act on them. Conversely films, above all those from self-polishing emulsions having a high plastics content, can no longer be removed even with strong alkali after prolonged ageing and must then in most cases be detached mechanically.

For reasons of stability it is necessary that the self-polishing emulsion particles should contain carboxyl groups which may originate from the wax acids or resin acids or from the unsaturated carboxylic acids which have been copolymerised in the polymer dispersions. In the polish films, these carboxyl groups influence the resistance to water and detergents as well as the removability. When aqueous alkali acts on the dry film salt formation takes place and the film is re-emulsified and thereupon detaches. This reaction thus admittedly assists the removability of the films but worsens their water resistance or detergent resistance. There has therefore been no lack of attempts to discover self-polishing emulsions which do not exhibit these disadvantages. Thus for example the polymer dispersions containing metal salts, that is to say anionic self-polishing emulsions, were developed (compare Resin Review, volume XVI, Issue 1, page 20) which contain metal ions such as zinc or zirconium which have the task of reacting with the carboxyl groups in the film. The carboxyl groups are thereby blocked and the re-emulsification by water or cleaning agent is prevented. A cross-linking of the polymer molecules simultaneously occurs. On adding ammonia or similar complex-forming agents to the cleaning agent the metal atoms are particularly easily removed from the film and the film is detached as a result of re-emulsification. Self-polishing emulsions which consist of mixtures of polymer dispersions and alkaline resin solutions and in which the detergent resistance is also improved by the addition of metal salts are described in U.S. patent specification 3,308,078.

In the polymer dispersions containing metal salts which have been mentioned the desired effect is above all bound up with the composition and structure of the copolymers used. Since one is always dealing with mixtures of which 80 to 100% consist of polymer dispersions, they also contain only a little wax, or none at all. This however proves to be a disadvantage in as much, as is known, films of self-polishing emulsions containing more than 50% by weight of polymer constituent can no longer be after-polished, so that damages or scratches can not be repaired, in distinction to polymer-free or wax-rich film. If however waxes are added to the polymer dispersions containing metal salts, or their proportion of wax is increased to 40% or above, in order to obtain polishable films, the improving effect of the metal ions is again lost.

A special class of wax emulsions for the care of floors is represented by the non-ionic emulsions manufactured with non-ionic emulsifiers, which are very popular since they can be manufactured particularly easily and reliably. However, the even wider spread of this type of emulsion is opposed by disadvantages in the film properties consisting of the fact that films of these emulsions are easily re-emulsified merely by water alone even several days after application, so that drops of water leave ugly spots. After prolonged ageing such films admittedly also become water-resistant but they can then only be removed again with great difficulty.

It has now been found that non-ionic aqueous self-polishing emulsions of the following composition do not show these disadvantages.

The self-polishing emulsions according to the invention consist of 10–40% by weight of a natural or synthetic ester wax having an acid number of between 2 and 100, it being possible to replace up to 50% by weight of the ester wax by an oxidized or non-oxidized paraffin wax, micro-crystalline wax or emulsifiable polyolefine wax, 1.0–15.0% by weight of a non-ionic emulsifier, 89–45% by weight of water and 0.25–3 equivalents, relative to the carboxyl groups of the wax, of a water-soluble salt of zinc and/or aluminium and/or cadmium. They yield films of high water resistance and detergent resistance which can be easily removed with alkaline cleaning agents, which when damaged can be excellently re-polished and which show very good behaviour when walked upon. They thus clearly and advantageously differ from the corresponding emulsions which are free of metal salts and are, as regards the ability to be re-polished, also superior to the known self-polishing emulsions based on polymers and containing metal salts.

The self-polishing emulsions claimed may, up to a content of 80%, be mixed with suitable polymer dispersions, for example with polyvinyl acetate, poly-styrene, polyacrylate and styrene-acrylate copolymer dispersions, but it must be borne in mind that at a content of more than 30–40% of the copolymer dispersion the stability to alkali and the removability suffer if additional metal salts are not incorporated in order to block the carboxyl groups contained in the copolymer dispersion. Furthermore the ease of polishing declines sharply with increasing quantities of copolymer dispersion. Since, as has already been emphasised, the ease of polishing of the films is sought as a practical advantage, amounts of copolymer of up to 30% are in general added.

The self-polishing emulsions claimed contain, in 100 parts by weight, 10 to 40 parts by weight of a natural or synthetic ester wax having an acid number of between 2 and 100, preferably 20 and 50. Suitable ester waxes are for example carnauba wax, ouricury wax, candelilla wax, the products obtained from natural waxes by refining or oxidation, but especially the ester waxes obtainable by chromic acid oxidation of deresinated or non-deresinated crude montan wax and subsequent esterification. Up to 50% by weight of these ester waxes may optionally be replaced by other waxes such as for example non-oxidised or oxidised paraffins, micro-crystalline waxes or emulsifiable polyolefine waxes.

Fatty alcohols, fatty acids, fatty amines or alkylphenols which have been ethoxylated with 5–30 mols, preferably 10–25 mols, of ethylene oxide serve as emulsifiers. The requisite amount of emulsifier is between 1.0 and 15, preferably 1.5 and 10% by weight relative to 100 parts by weight of the self-polishing emulsion, or, expressed differently, an amount which is 10 to 40, preferably 15 to 25% of the weight of the wax constituent contained in the emulsion. Whilst with conventional non-ionic wax emulsions the amount of emulsifier must not be more than 15–20% of the wax constituents since otherwise the water resistance is greatly reduced, the amount of emulsifier is by far less critical in the emulsions according to the invention. In some cases an increase in the emulsifier concentration to above 25% of the wax constituent here even results in an improvement in the desired effects.

Suitable metal additives are soluble salts of zinc, cadmium and aluminium with inorganic or organic anions, for example the chlorides, nitrates, sulphates, propionates and especially the acetates. Since non-ionic wax emulsions in most cases react slightly acid (pH 4–6) the addition of the metal salts in general does not produce any troubles.

The amount of the metal ions to be added depends on the acid number of the wax component as a whole and should be 0.25 to 3, preferably 0.5 to 2, equivalents relative to the carboxyl groups of the wax.

It is of course also furthermore possible to incorporate into the wax emulsions according to the invention, additions of alkali-soluble resins, wax-soluble resins, plasticisers, solvents, surface-active substances, dyestuffs, amines, fixed alkalis and the like which are usual in self-polishing emulsions, in order to establish further special properties such as film-formation, emulsion quality and film quality.

In the text which follows the advantages of the self-polishing emulsions containing metal salts according to the present invention are indicated, with the aid of examples, by comparison of various properties as regards technique of use with those of conventional emulsions which are free of metal salts.

EXAMPLE 1

(a)

10.5 parts of a synthetic ester wax based on crude montan wax having an acid number of 30 are fused with 1.5 parts of a non-ionic emulsifier based on a fatty alcohol ethoxylated with about 15 mols of ethylene oxide, at 110° C.

The wax is emulsified by adding 88.0 parts of boiling water, whilst stirring, after which the emulsion is rapidly cooled to room temperature.

The technical use properties of a self-polishing film of this emulsion are given under 1a in the table.

(b)

2.5 parts of a 25% strength aqueous zinc acetate solution are added to 100 parts by weight of this wax emulsion, whilst stirring. The table shows, under 1b, the properties exhibited by a wax film manufactured from this emulsion.

EXAMPLE 2

(a) A self-polishing emulsion is manufactured from 8.0 parts of ester wax of acid number 30,
4.0 parts of oxidised micro-crystalline wax of acid number 30,
1.9 parts of non-ionic emulsifier containing 15 mols of ethylene oxide, and
86.1 parts of water, as described in Example 1.

The wax film made from this emulsion possesses the properties mentioned in the table under 2a.

(b) Thereafter 2.0 parts of a 25% strength zinc acetate solution are stirred into 100 parts by weight of the emulsion. The properties of a self-polishing film produced from this mixture may be seen under experiment 2b in the table.

EXAMPLE 3

(a) A wax emulsion is manufactured as in Example 1, from 10.5 parts of an ester wax of acid number 30,
1.8 parts of a non-ionic emulsifier containing 15 mols of ethylene oxide, and
87.7 parts of water.

After cooling 80.0 parts of this emulsion are mixed with 20 parts of a 12% strength polyvinyl acetate dispersion.

(b) 2.5 parts of a 25% strength zinc acetate solution are added to 100 parts by weight of the above mixture.

The properties of the wax films with or without addition of the zinc salt solution are summarised in the table, under 3a and 3b respectively.

EXAMPLE 4

An emulsion is manufactured in accordance with Example 1 from 10.5 parts of ester wax of acid number 35,
1.8 parts of non-ionic emulsifier,
87.7 parts of water, and
4.0 parts of a 10% strength aluminum chloride solution.

Wax films obtained from this self-polishing emulsion correspond to those obtained according to Example 1.

The table which follows contains the results of testing for intrinsic gloss in percent, as well as for water resistance, detergent resistance, removability and soiling in the walking test, given in ratings of 1 to 6, with 1 denoting an excellent result and 6 a completely inadequate result.

| Technical use properties | Experimental product according to Example— | | | | | |
|---|---|---|---|---|---|---|
| | 1a | 1b | 2a | 2b | 3a | 3b |
| Intrinsic gloss, percent | 65 | 66 | 78 | 80 | 63 | 77 |
| Water resistance after 24 hours | 5 | 2 | 3–4 | 2 | 1–2 | 1–2 |
| Deterge.- resistance after 24 hours | 6 | 1 | 3 | 1 | 4 | 1 |
| Removability after 48 hours | 1 | 1 | 2 | 2 | 1 | 1 |
| Soiling after 1 week | 3 | 1 | 4 | 2 | 2 | 1 |

As may be seen, the technical use properties here investigated are throughout improved by the addition of the metal salt solution. Above all, films of very high detergent resistance are thereby produced. As a result of the reaction with the metal atoms non-ionic films also lose their tackiness more rapidly and this manifests itself in less soiling in the walking test.

The gloss values were measured photoelectrically using the gloss meter according to Dr. B. Lange, Berlin. The figures are percentages related to a certain gloss standard = 100%. In determining the resistance to water on linoleum, filter paper soaked with water is allowed to act on the film for half an hour and the re-emulsification of the film after drying is assessed.

The detergent resistance was tested according to a method similar to the Gardner test, on PVC, by treating the film with a common household cleaning agent (2% strength solution of the cleaning agent Spic and Span of Messrs. Procter and Gamble) under constant load. In order to determine the removability, 5 percent of concentrated ammonia were added to the cleaning agent and the film subjected to the same conditions as when testing the detergent resistance. The soiling was assessed visually after one week's walking time in a walking experiment on PVC.

We claim:

1. The method of improving the stability, water resistance and intrinsic gloss of self-polishing emulsions for the care of floors comprising an aqueous emulsion of a natural or synthetic ester wax having an acid number of between 2 and 100 with a content of 10 to 40% by weight of the wax, 1.0 to 15% by weight of a non-ionic emulsifier which is an oxethylation product of 5 to 30 mols of ethylene oxide with a fatty alcohol, fatty acid, fatty amine or alkylphenol and 89 to 45% by weight of water, wherein the improvement consists essentially of adding to the preformed aqueous wax emulsion from about 0.25 to 3 equivalents, relative to the carboxyl groups of the wax, of at least one metal salt selected from the group consisting of water soluble chlorides, nitrates, sulphates, propionates and acetates of zinc, aluminum and cadmium.

2. Self-polishing emulsions produced according to claim 1 characterized in that up to 50% by weight of the ester wax is replaced by an oxidized or non-oxidized paraffin wax, microcrystalline wax or emulsifiable polyolefine wax.

No references cited.

JOAN B. EVANS, Primary Examiner

U.S. Cl. X.R.

106—8, 10, 231, 268, 271; 260—28.5